(12) United States Patent
Tsuto

(10) Patent No.: US 11,144,122 B2
(45) Date of Patent: Oct. 12, 2021

(54) HAPTIC FEEDBACK DEVICE

(71) Applicant: FUJIFILM BUSINESS INNOVATION CORP., Tokyo (JP)

(72) Inventor: Satoru Tsuto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/942,902

(22) Filed: Jul. 30, 2020

(65) Prior Publication Data
US 2021/0232222 A1    Jul. 29, 2021

(30) Foreign Application Priority Data

Jan. 27, 2020  (JP) .............. JP2020-010750

(51) Int. Cl.
*G06F 3/01*    (2006.01)
*G06F 3/033*   (2013.01)

(52) U.S. Cl.
CPC .............. *G06F 3/014* (2013.01); *G06F 3/016* (2013.01); *G06F 3/033* (2013.01); *G06F 2203/0331* (2013.01)

(58) Field of Classification Search
CPC ........... G06F 3/014; G06F 3/016; G06F 3/033
USPC ........................................... 345/156
See application file for complete search history.

(56) References Cited

U.S. PATENT DOCUMENTS

| | | | | |
|---|---|---|---|---|
| 10,474,236 B1* | 11/2019 | Stewart | .................... | G06F 3/017 |
| 10,642,356 B1* | 5/2020 | Wang | .................. | G06F 3/03547 |
| 2010/0041521 A1* | 2/2010 | Ingvast | .................. | B25J 9/0006 482/49 |
| 2013/0291282 A1* | 11/2013 | Anstey | .................... | A41D 19/00 2/161.7 |
| 2014/0259283 A1* | 9/2014 | Govindasamy | .... | A41D 19/0082 2/161.7 |
| 2016/0054797 A1* | 2/2016 | Tokubo | ................... | G06F 3/016 345/633 |
| 2016/0162022 A1* | 6/2016 | Seth | ........................ | G06F 3/017 345/156 |
| 2016/0187973 A1* | 6/2016 | Shankar | ................... | G09G 5/18 345/156 |
| 2017/0160807 A1* | 6/2017 | Keller | ...................... | G06F 3/014 |
| 2017/0168565 A1* | 6/2017 | Cohen | .................. | A61B 5/0022 |
| 2017/0215495 A1* | 8/2017 | Okumiya | ............... | G01B 7/287 |
| 2017/0262060 A1* | 9/2017 | Katsuki | .................... | G06F 3/038 |
| 2018/0196515 A1* | 7/2018 | Appleyard | .............. | G06F 3/011 |
| 2018/0311570 A1* | 11/2018 | Buchanan | .............. | A63F 13/24 |
| 2018/0356893 A1* | 12/2018 | Soni | ....................... | G06F 3/0346 |
| 2019/0101981 A1* | 4/2019 | Elias | ..................... | A63F 13/211 |
| 2019/0101982 A1 | 4/2019 | Tsuto | | |
| 2019/0209086 A1* | 7/2019 | Huang | ................. | A61B 5/1125 |

(Continued)

FOREIGN PATENT DOCUMENTS

| JP | 2019-67166 A | 4/2019 |
|---|---|---|
| WO | 2017/033381 A1 | 3/2017 |

*Primary Examiner* — Albert K Wong
(74) *Attorney, Agent, or Firm* — Oliff PLC

(57) ABSTRACT

A haptic feedback device includes an elastic glove body, at least one haptic feedback element, a flexible member, and a wire. The haptic feedback element is installed on the glove body. The flexible member is flexible and less elastic than the glove body. The flexible member is disposed between a back side and a palm side of the glove body. The wire is connected to the haptic feedback element and extends along the flexible member.

20 Claims, 6 Drawing Sheets

(56) References Cited

U.S. PATENT DOCUMENTS

| | | | |
|---|---|---|---|
| 2019/0216147 A1* | 7/2019 | Lamontia | B32B 1/00 |
| 2019/0265781 A1* | 8/2019 | Kehoe | G06F 1/1686 |
| 2019/0294250 A1* | 9/2019 | Martin | G06F 3/0346 |
| 2019/0297970 A1* | 10/2019 | Gramlin | A41D 31/065 |
| 2019/0332140 A1* | 10/2019 | Wang | G06F 3/014 |
| 2019/0384390 A1* | 12/2019 | Cruz Hernandez | A63F 13/235 |
| 2020/0012344 A1* | 1/2020 | McMillen | G06F 3/016 |
| 2020/0029635 A1* | 1/2020 | Kiemele | G06F 3/014 |
| 2020/0081533 A1* | 3/2020 | Holbery | D03D 1/0088 |
| 2020/0333880 A1* | 10/2020 | Ara Jo | G06F 3/016 |
| 2020/0371591 A1* | 11/2020 | Remaley | G06F 3/016 |
| 2020/0387222 A1* | 12/2020 | Adesanya | G06F 3/14 |
| 2021/0081048 A1* | 3/2021 | Sedal | G06T 19/006 |

* cited by examiner

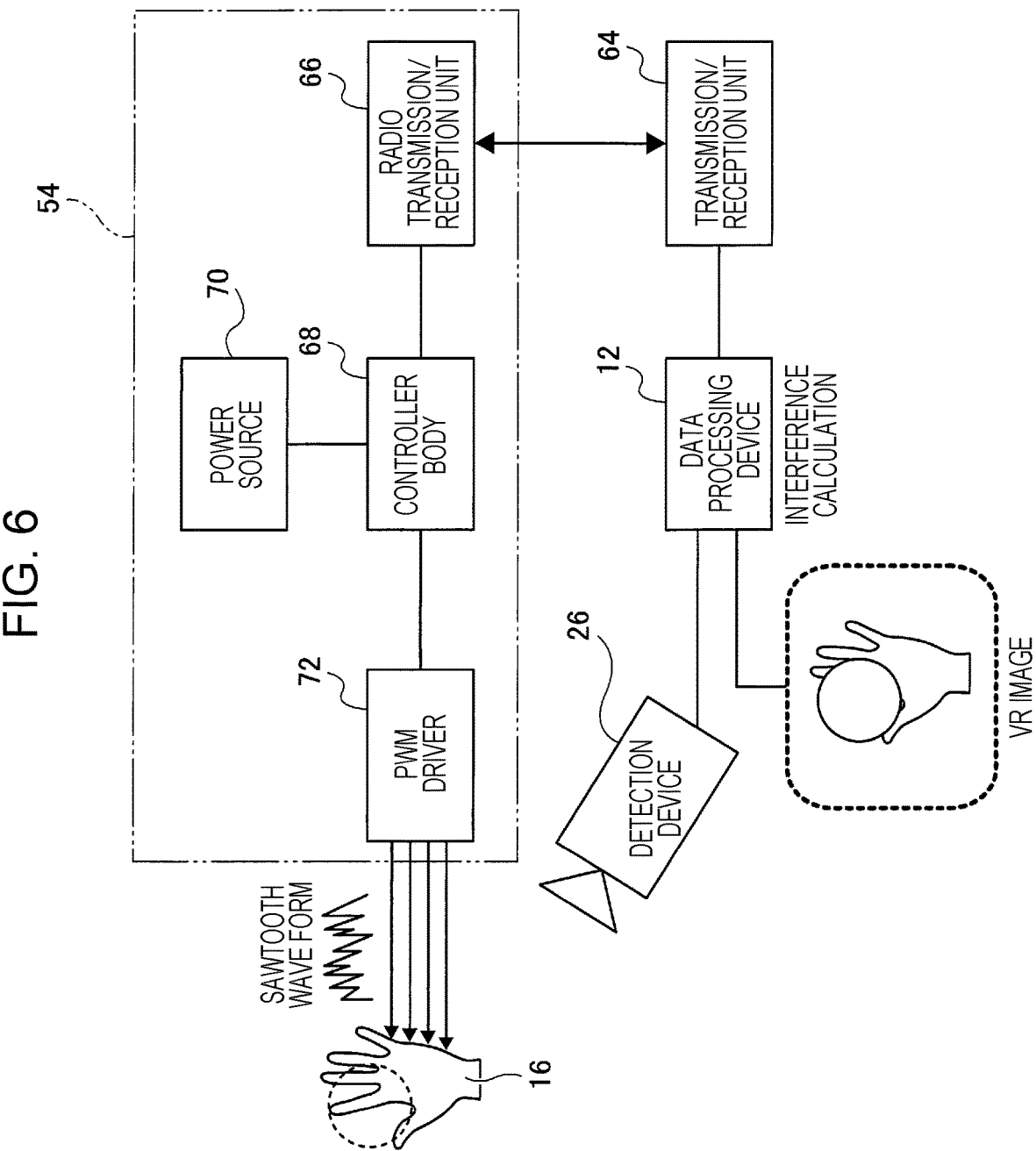

HAPTIC FEEDBACK DEVICE

CROSS-REFERENCE TO RELATED APPLICATIONS

This application is based on and claims priority under 35 USC 119 from Japanese Patent Application No. 2020-010750 filed Jan. 27, 2020.

BACKGROUND

(i) Technical Field

The present disclosure relates to a haptic feedback device.

(ii) Related Art

Japanese Unexamined Patent Application Publication No. 2019-67166 discloses an electronic device including a contact portion that comes into contact with finger pads to stimulate the fingers and/or to receive information from the fingers. The electronic device is worn on a finger while leaving part of the finger on the finger pad side from the first joint to the fingertip exposed except the portion touched by the contact portion.

International Publication No. 2017/033381 discloses a haptic feedback device including a glove on which multiple press elements are installed.

SUMMARY

Aspects of non-limiting embodiments of the present disclosure relate to a haptic feedback device capable of improving adhesion of a haptic feedback element to a hand inserted into a glove, compared to a glove on which a haptic feedback element is simply installed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a haptic feedback device including an elastic glove body, at least one haptic feedback element, a flexible member, and a wire. The haptic feedback element is installed on the glove body. The flexible member is flexible and less elastic than the glove body. The flexible member is disposed between a back side and a palm side of the glove body. The wire is connected to the haptic feedback element and extends along the flexible member.

BRIEF DESCRIPTION OF THE DRAWINGS

Exemplary embodiments of the present disclosure will be described in detail based on the following figures, wherein:

FIG. 4A is a plan view of a glove body in an initial state, FIG. 4B is a plan view of a dummy used to prestretch the glove body, and FIG. 4C is a plan view of a flexible member and a glove body to which the flexible member is fixed;

FIG. 6 is a block diagram of an electric configuration of a haptic feedback system including a haptic feedback device according to an exemplary embodiment of the present disclosure.

DETAILED DESCRIPTION

Exemplary embodiments of the present disclosure will now be described below in detail with reference to the drawings.

Figure 1:
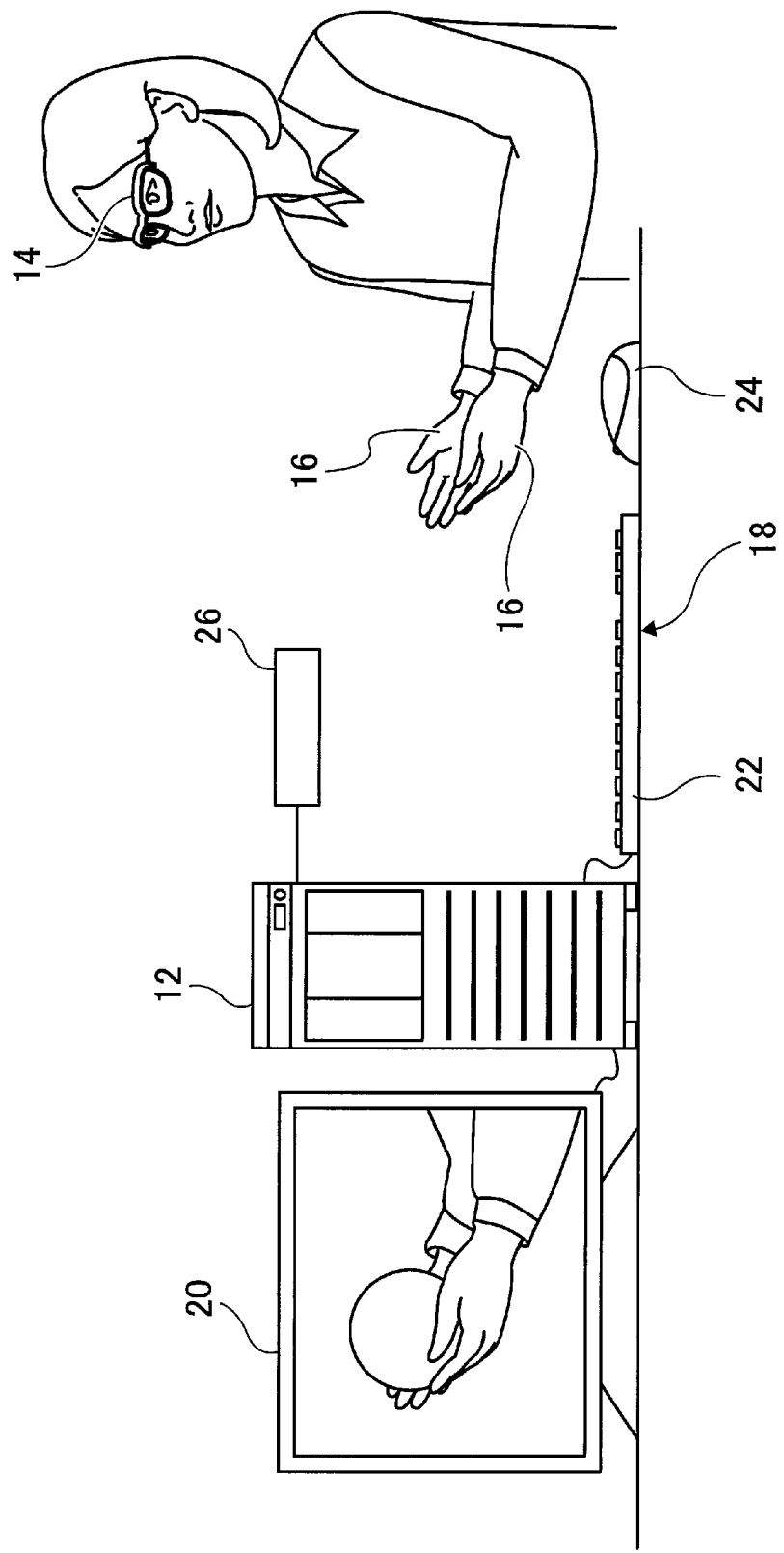
FIG. 1 is a block diagram of a haptic feedback system including a haptic feedback device according to an exemplary embodiment of the present disclosure.

FIG. 1 illustrates a haptic feedback system 10 according to an exemplary embodiment of the present disclosure. As illustrated in FIG. 1, the haptic feedback system 10 includes a data processing device 12, and a head mount display device 14, and haptic feedback devices 16.

The data processing device 12 processes data for controlling the head mount display device 14 and the haptic feedback devices 16. Examples usable as the data processing device 12 include a personal computer. An input device 18 and a display device 20 are connected to the data processing device 12. Examples usable as the input device 18 include a keyboard 22 and a mouse 24. Examples usable as the display device 20 include a liquid crystal display device.

The head mount display device 14 is a display device worn by the head of an operator in such a manner as the operator wears glasses. Examples usable as the head mount display device 14 include a retinal scan display device. The head mount display device 14 displays virtual images generated by the data processing device 12. Here, the head mount display device 14 displays an image the same as the image displayed on the display device 20 and generated by the data processing device 12.

The haptic feedback devices 16 are devices that provide haptic feedback to an operator as if the operator actually comes into contact with a virtual object. As will be described later, each haptic feedback device 16 has a glove shape. In the exemplary embodiment, the haptic feedback devices 16 provide haptic feedback to an operator as if the operator actually comes into contact with a virtual object generated by the data processing device 12 and displayed on the head mount display device 14 and the display device 20.

The haptic feedback system 10 also includes a detection device 26. The detection device 26 detects the positions of the operator's hands and the haptic feedback devices 16, and movements of the operator's hands and the haptic feedback devices 16. The detection device 26 may be a camera, an accelerometer or a gyroscope installed in the haptic feedback device 16, or a combination of a camera and a sensor.

The haptic feedback devices 16 are worn on left and right hands, and have the same structure. Here, only the haptic feedback device 16 for the left hand will be described.

Figure 2:
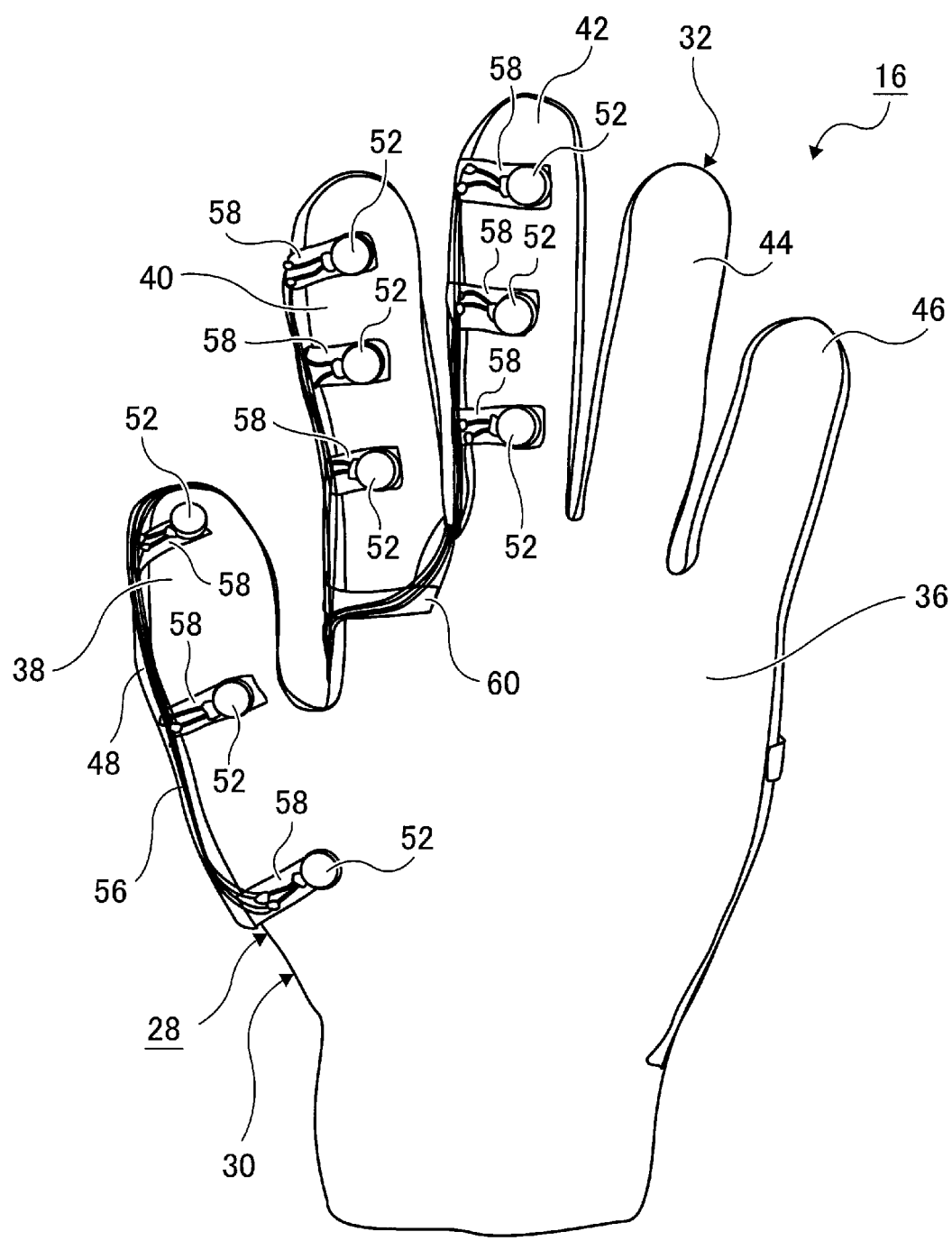
FIG. 2 is a plan view of the haptic feedback device according to an exemplary embodiment of the present disclosure, viewed from the palm side.
Figure 3:
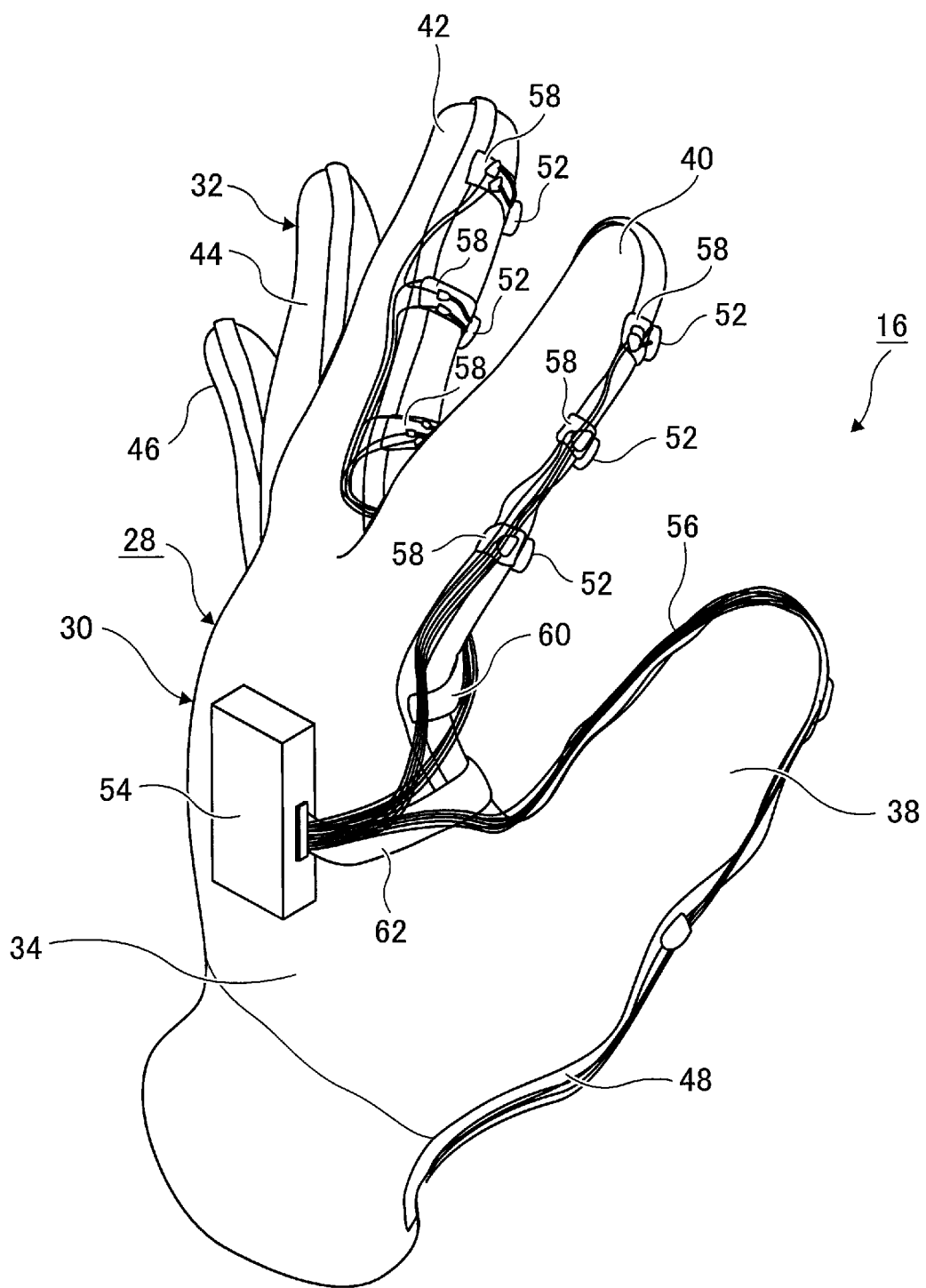
FIG. 3 is a perspective view of the haptic feedback device according to an exemplary embodiment of the present disclosure, viewed from the back side.

As illustrated in FIGS. 2 and 3, the haptic feedback device 16 includes a glove body 28. The glove body 28 is formed from synthetic rubber such as polyurethane, and elastic. As in the case of a normal glove, the glove body 28 includes a palm receiving section 30 and finger receiving sections 32.

The palm receiving section 30 is formed by joining a back portion 34 and a palm portion 36 together. The finger receiving sections 32 include a thumb receiving section 38, which receives the thumb, a index-finger receiving section 40, which receives the index finger, a middle-finger receiving section 42, which receives the middle finger, a ring-finger receiving section 44, which receives the ring finger, and a little-finger receiving section 46, which receives the little finger.

A flexible member 48 is disposed between the back side and the palm side of the glove body 28. In this exemplary embodiment, the flexible member 48 is disposed as a single unit substantially throughout a portion between the back portion 34 and the palm portion 36 of the palm receiving section 30 and a portion between the back side and the palm side of the finger receiving sections 32.

The flexible member 48 is flexible, that is, freely bendable, but less elastic than the glove body 28. The flexible member 48 is fixed to the glove body 28 while the glove body 28 is stretched in advance (or prestretched, below) to fix the glove body 28 in a prestretched state.

The flexible member 48 is fixed to the glove body 28 in the following manner.

Figure 4C:
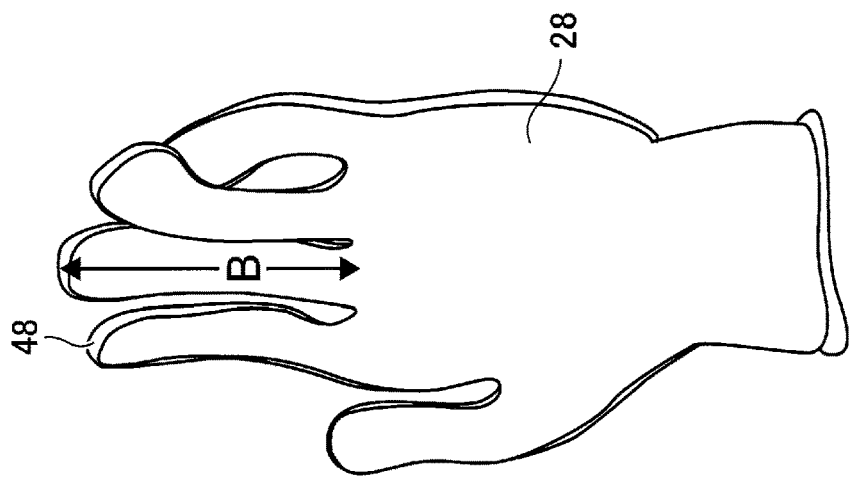
FIGS. 4A, 4B, and 4C illustrate steps of installing a flexible member on a glove body according to an exemplary embodiment of the present disclosure, where
Figure 4B:
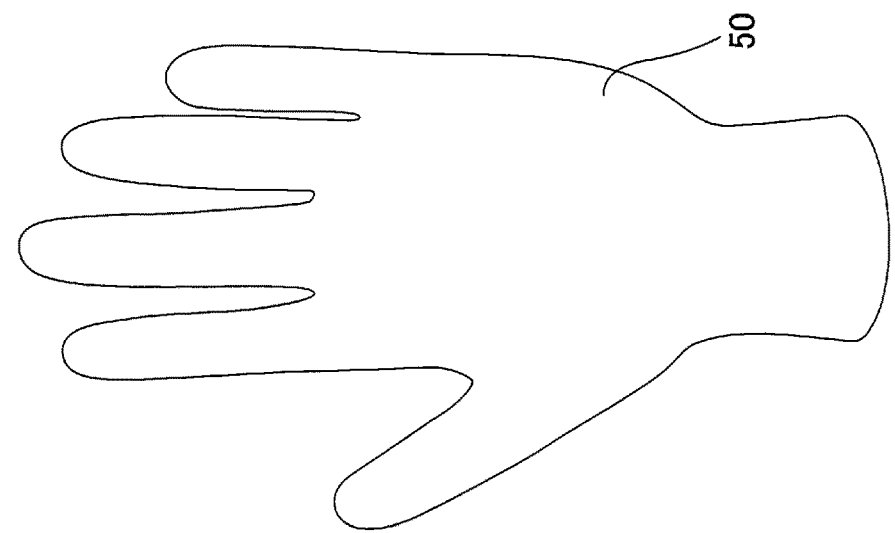
Figure 4A:
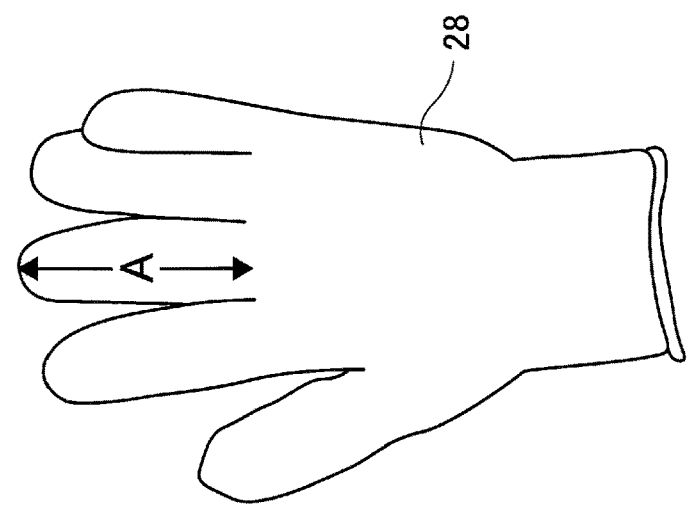

As illustrated in FIG. 4A, the glove body 28 in an initial state is prepared.

As illustrated in FIG. 4B, a dummy 50 for applying a prestretch is prepared. The dummy 50 is formed by, for example, forming a dummy body with paper clay, and covering the dummy body with a rubber glove. The dummy 50 is shaped to have a size corresponding to the size of a user's hand.

Subsequently, the glove body 28 illustrated in FIG. 4A is fitted to the dummy 50 illustrated in FIG. 4B. Then, while the glove body 28 is left fitted to the dummy 50, the flexible member 48 is fixed to between the back side and the palm side of the glove body 28 with, for example, an adhesive.

Subsequently, the glove body 28 is removed from the dummy 50 to be completed, as illustrated in FIG. 4C. Specifically, as will be understood with comparison between FIGS. 4A and 4C, when, for example, the length of the middle-finger receiving section 42 in the middle-finger insertion direction is compared, after undergoing prestretching, the middle-finger receiving section 42 is left stretched to have a length B from a length A in an initial state, so that the prestretch in the finger insertion direction is retained. Specifically, the glove body 28 shrinks in the finger insertion direction by the amount by which the flexible member 48 is gently bent, but is prevented from shrinking further by the flexible member 48. Except for portions to which the flexible member 48 is fixed, the glove body 28 shrinks in directions other than the finger insertion direction without retaining the prestretched state.

Figure 5:
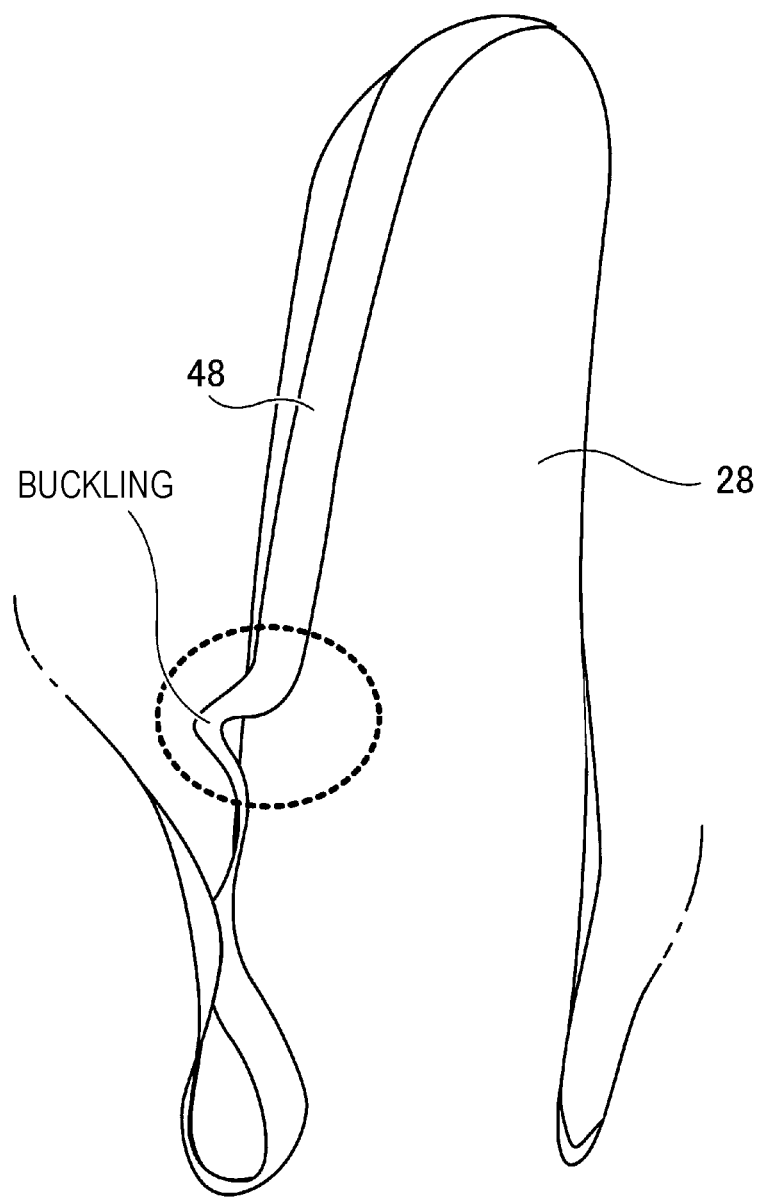
FIG. 5 is a plan view of a flexible member with buckling according to a comparative example, compared with the present disclosure.

Here, the flexible member 48 is formed from, for example, synthetic leather, and has such strength and a cross-section that it is prevented from being buckled against contractile force in the finger length direction after being released from the prestretch. As illustrated in FIG. 5, buckling is a state where the tension of a prestretch causes a bent so that the absolute length in the direction toward the fingertips is reduced. When the flexible member 48 is buckled, a wire, described later, may be broken. Thus, buckling of the flexible member 48 is to be prevented.

The flexible member 48 preferably has low flexural rigidity by being formed into a thin shape and formed from a material having a high Young's modulus. For example, a metal material such as a piano wire has high flexural rigidity even formed into a thin shape, so that a structure including a large number of electric wires is impractical. Polyimide resin used for a flexible electric wire has difficulty in adhering to the elastic glove body 28, so that the adhesive is unbearable to the amount of deformation of the glove body 28 resulting from insertion and removal of the hand. Although a structure with a low Young's modulus may be made substantially unstretchable by increasing the cross-sectional shape, such a structure is not suitable for a haptic feedback device. In other words, using a material with an appropriate Young's modulus and an appropriate cross-sectional shape is preferable.

The width of the flexible member 48 is preferably 2 to 4 mm, as a wire described below has a width of approximately 2 mm. However, the width of the flexible member 48 may be 4 to 6 mm with adjustments of the Young's modulus and the cross-sectional shape. When the width of the flexible member 48 exceeds 6 mm, the width may exceed the width of a portion between the back side and the palm side of the glove body 28.

Multiple haptic feedback elements 52 are installed on the glove body 28. Each haptic feedback element 52 is formed from, for example, a vibration motor. Each haptic feedback element 52 may include a driving element such as a piezoelectric element or a shape memory element instead of the vibration motor.

In the present exemplary embodiment, the haptic feedback elements 52 are disposed on the palm side of the glove body 28 at three positions on each of the thumb receiving section 38, the index-finger receiving section 40, and the middle-finger receiving section 42. These haptic feedback elements 52 are fixed to portions corresponding to the finger pads excluding the portions corresponding to the joints of fingers inserted into the thumb receiving section 38, the index-finger receiving section 40, and the middle-finger receiving section 42.

A controller 54 is fixed to the back portion 34 of the palm receiving section 30 of the glove body 28. The controller 54 and the above-described haptic feedback elements 52 are connected with wires 56.

The flexible member 48 includes first connection portions 58, each of which connects the corresponding haptic feedback element 52 to a portion between the back side and the palm side of the glove body 28. Each first connection portion 58 has a first end fixed to the portion of the flexible member 48 between the back side and the palm side of the glove body 28, and a second end fixed to the corresponding haptic feedback element 52. Each first connection portion 58 is left unfixed to the glove body 28 except for the first and second ends.

If the first connection portions 58 in the prestretched state are fixed to the glove body 28 as in the case of the flexible member 48 disposed between the back side and the palm side of the glove body 28, the first connection portions 58 may fail to be hooked on inserted fingers, and the tension on the first connection portions 58 may fail to be exerted on the fingers. In contrast, in the exemplary embodiment, the first connection portions 58 with only both ends fixed are hooked on the fingers, and receive tension to press the haptic feedback elements 52 against the fingers.

The first connection portions 58 are disposed on only the outer sides of the thumb receiving section 38, the index-finger receiving section 40, and the middle-finger receiving section 42. However, the first connection portions 58 may also be disposed on the inner sides of the thumb receiving section 38, the index-finger receiving section 40, and the middle-finger receiving section 42 to have a shape of a pair of glasses with the haptic feedback elements 52 at the middle.

The flexible member 48 includes a second connection portion 60, which connects an outer portion of the index-finger receiving section 40 and an outer portion of the middle-finger receiving section 42 together. The second connection portion 60 has a first end disposed at the proximal end of the index-finger receiving section 40 of the glove body 28 and fixed to a portion between the back side and the palm side, and a second end fixed to a portion between the back side and the palm side of the middle-finger receiving section 42 via the proximal ends of the index-finger receiving section 40 and the middle-finger receiving section 42. The second connection portion 60 is disposed aside the joints of the hand. As in the case of the first connection portions 58, the second connection portion 60 is left unfixed to the glove body 28 except for first and second ends. However, the second connection portion 60 may have a fixed portion between the first and second ends.

The flexible member 48 also has a third connection portion 62, connected to the controller 54 on the back side from the proximal end of the index-finger receiving section 40 of the glove body 28. As in the case of the first connection portions 58 and the second connection portion 60, the third connection portion 62 also has a first end and a second end fixed, while having a portion between the first and second ends left unfixed.

When viewed from the controller 54, the wires 56 extend from the controller 54 along the third connection portion 62, and bifurcate toward the thumb receiving section 38 and the index-finger receiving section 40. A first bifurcated bundle of the wires 56 extends downward along the flexible member 48 on the outer side of the thumb receiving section 38 to be connected to three haptic feedback elements 52 disposed on the thumb receiving section 38 along the first connection portions 58. A second bifurcated bundle of the wires 56 is further divided into a wire bundle extending to the upper side of the index-finger receiving section 40 along the flexible member 48 on the outer side of the index-finger receiving section 40, and a wire bundle extending to the upper side of the middle-finger receiving section 42 along the flexible member 48 on the outer side of the middle-finger receiving section 42 along the second connection portion 60. The wire bundle extending to the upper side of the index-finger receiving section 40 is connected to three haptic feedback elements 52 disposed on the index-finger receiving section 40. The wire bundle extending to the upper side of the middle-finger receiving section 42 is connected to three haptic feedback elements 52 disposed on the middle-finger receiving section 42.

When each haptic feedback element 52 is formed from a vibration motor, a back-electromotive-force suppression diode and a peak-voltage suppression capacitor are disposed on the wires 56 near the haptic feedback element 52. The vibration motor has inductance of a coil, and causes an overshoot voltage at the startup or a back electromotive voltage at the stop. The former is rectified by an appropriate capacitor, and the latter is rectified by a control square wave to secure the accuracy of the duty ratio of PWM control, described below.

Preferably, three or more haptic feedback elements 52 are disposed on each finger, as in the above exemplary embodiment. For example, a time lag in haptic feedback between the haptic feedback elements 52 provides a user a sense of touch on a flowing or moving object.

FIG. 6 illustrates an electric configuration of the haptic feedback system 10.

The data processing device 12 performs interference calculation on operation data of the haptic feedback device 16 detected from the detection device 26 and image data displayed on the head mount display device 14 or the display device 20. The data processing device 12 and the controller 54 respectively include radio transmission/reception units 64 and 66 to transmit or receive data therebetween.

The controller 54 includes a radio transmission/reception unit 66, a controller body 68 formed from, for example, a microcomputer, a power source 70, and a pulse width modulation (PWM) driver 72. Pulse width modulation is a power control method to generate a regular on/off cycle of a pulse train and change the width of an on-time period.

A driving wave form fed to each haptic feedback element 52 rises with an impulse response, and falls with a ramp response to form a reverse sawtooth wave form. Deactivation stop of a haptic signal is performed at a predetermined ramp slope. Sensation to the skin tends to be emphasized at a contact edge, and weakened with a continuous contact. The data processing device 12 has to manage the contact state of multiple points. If the data processing device 12 has to manage deactivation in addition to activation of contacts, communication processing between the data processing device 12 and the controller 54 is increased to twice or larger to increase the risk of failures in catching control signals. Failures in catching stop signals are particularly problematic. Keeping vibrations active without a contact would significantly annoy a user. The above-described processing reduces the communications to reduce occurrence of erroneous feedback.

The impulse response may vary its strength in accordance with haptic strength. The control signal may also include a ramp slope or the PWM driver 72 may include a ramp slope in an impulse function.

When intermittent contacts occur frequently, (when a pulse train is frequently turned on and off), attenuation of a ramp signal may be interrupted to preferentially control an on impulse signal to keep the haptic feedback active.

In the exemplary embodiment, the haptic feedback elements are installed on the thumb receiving section, the index-finger receiving section, and the middle-finger receiving section. However, the haptic feedback elements may be installed on other finger receiving sections, or a palm receiving section.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A haptic feedback device, comprising:
    an elastic glove;
    at least one haptic feedback element installed on the glove;
    a flexible member that is less elastic than the glove, the flexible member being disposed between a back side and a palm side of the glove so that the flexible member fixes a finger of the glove in a pre-stretched state along an insertion direction of the finger, and the flexible member has a combination of strength and cross-section that prevent the flexible member from being buckled along the insertion direction of the finger due to contractile force from the pre-stretched state; and a wire connected to the haptic feedback element and extending along the flexible member.

2. The haptic feedback device according to claim 1, wherein the flexible member prevents the glove from being stretched in a direction in which a finger of a hand inserted into the glove extends while the glove is being stretched by the hand inserted into the glove.

3. The haptic feedback device according to claim 1, wherein the flexible member allows a portion of the glove on which the haptic feedback element is disposed to be stretched while the glove is being stretched by a hand inserted into the glove.

4. The haptic feedback device according to claim 1, wherein the flexible member includes a first connection portion that connects from a portion between a back side and a palm side of the glove to the haptic feedback element.

5. The haptic feedback device according to claim 2, wherein the flexible member includes a first connection portion that connects from a portion between a back side and a palm side of the glove to the haptic feedback element.

6. The haptic feedback device according to claim 3, wherein the flexible member includes a first connection portion that connects from a portion between a back side and a palm side of the glove a to the haptic feedback element.

7. The haptic feedback device according to claim 4, wherein the wire is disposed on an area including the first connection portion.

8. The haptic feedback device according to claim 5, wherein the wire is disposed on an area including the first connection portion.

9. The haptic feedback device according to claim 6, wherein the wire is disposed on an area including the first connection portion.

10. The haptic feedback device according to claim 4, wherein the first connection portion is fixed to the glove at only a portion between the back side and the palm side of the glove and a portion connected to the haptic feedback element.

11. The haptic feedback device according to claim 5, wherein the first connection portion is fixed to the glove at only a portion between the back side and the palm side of the glove and a portion connected to the haptic feedback element.

12. The haptic feedback device according to claim 6, wherein the first connection portion is fixed to the glove at only a portion between the back side and the palm side of the glove and a portion connected to the haptic feedback element.

13. The haptic feedback device according to claim 4, wherein the first connection portion is left unfixed to the glove between a portion between the back side and the palm side of the glove and a portion connected to the haptic feedback element.

14. The haptic feedback device according to claim 1, wherein the at least one haptic feedback element includes a plurality of haptic feedback elements respectively disposed on fingers of the glove, and wherein the flexible member includes a second connection portion extending from a portion between a back side and a palm side of the glove to a proximal end of one of the fingers apart from the portion between the back side and the palm side to be connected to a corresponding one of the haptic feedback elements.

15. The haptic feedback device according to claim 14, wherein the wire is disposed on an area including the second connection portion.

16. The haptic feedback device according to claim 14, wherein the second connection portion is fixed to the glove at only a portion between the back side and the palm side of the glove and the proximal end of the one of the fingers apart from the portion between the back side and the palm side.

17. The haptic feedback device according to claim 14, wherein the second connection portion is left unfixed to the glove between a portion between the back side and the palm side of the glove and the proximal end of the one of the fingers apart from the portion between the back side and the palm side.

18. The haptic feedback device according to claim 14, wherein the second connection portion is disposed at a portion excluding joints of a hand inserted into the glove.

19. The haptic feedback device according to claim 1, further comprising:

a controller that controls a driving signal output to the haptic feedback element, the controller being disposed on the back side of the glove.

20. The haptic feedback device according to claim 1, further comprising:

a controller that controls a driving signal output to the haptic feedback element, and the controller controls an output of an output signal in a reverse sawtooth wave form.

* * * * *